United States Patent [19]

Ward

[11] Patent Number: 4,904,091

[45] Date of Patent: Feb. 27, 1990

[54] THREADED AVERAGE TEMPERATURE THERMOCOUPLE

[75] Inventor: Stanley W. Ward, Newport News, Va.

[73] Assignee: The United States of America as represented by the Administrator of the National Aeronautics and Space Administration, Washington, D.C.

[21] Appl. No.: 391,694

[22] Filed: Aug. 10, 1989

Related U.S. Application Data

[63] Continuation of Ser. No. 244,376, Sep. 15, 1988, abandoned.

[51] Int. Cl.$^4$ .................... G01K 7/02; H01L 35/08
[52] U.S. Cl. .................................... 374/179; 374/141; 374/208; 73/147; 136/230; 136/232; 136/233
[58] Field of Search ............... 374/179, 185, 147, 208, 374/141; 136/230, 232, 233; 73/147

[56] References Cited

U.S. PATENT DOCUMENTS

| | | | |
|---|---|---|---|
| 2,525,439 | 10/1950 | Abbott | 136/230 |
| 2,779,810 | 1/1957 | Horbinski | 374/141 |
| 3,284,247 | 11/1966 | McCall | 136/233 |
| 3,376,169 | 4/1968 | Davis et al. | 136/230 |
| 3,376,170 | 4/1968 | Logan et al. | 136/233 |
| 3,907,606 | 9/1975 | Chang | 374/179 |
| 4,309,901 | 1/1982 | Rolinski et al. | 374/1 |
| 4,398,169 | 8/1983 | Hayashi | 374/165 |
| 4,778,538 | 10/1988 | Lyman | 136/232 |

FOREIGN PATENT DOCUMENTS

| | | | |
|---|---|---|---|
| 1004738 | 9/1965 | United Kingdom | 136/230 |
| 1102985 | 2/1968 | United Kingdom | 136/230 |
| 1338168 | 11/1973 | United Kingdom | 136/233 |

OTHER PUBLICATIONS

NASA SP-5050, "NASA Contributions to Development of Special-Purpose Thermocouples", 1968.
Omega Complete Temperature Measurement Handbook and Encyclopedia, vol. 26, 1988.
Bendersky, David, "A Special Thermocouple for Measuring Transient Temperatures", Mechanical Engineering, vol. 75, No. 2, pp. 117-121, Feb. 1953.
"Unusual Thermocouples and Accessories", Instruments & Control Systems, vol. 36, No. 8, pp. 130-133, Aug. 1963 and vol. 36, No. 7, pp. 99-103, Jul. 1963.

Primary Examiner—William A. Cuchlinski, Jr.
Assistant Examiner—Diego F. F. Gutierrez
Attorney, Agent, or Firm—Harold W. Adams; John R. Manning; Charles E. B. Glenn

[57] ABSTRACT

A threaded average temperature thermocouple 11 is provided to measure the average temperature of a test situs of a test material 30. A ceramic insulator rod 15 with two parallel holes 17 and 18 through the length thereof is securely fitted in a cylinder 16, which is bored along the longitudinal axis of symmetry of threaded bolt 12. Threaded bolt 12 is composed of material having thermal properties similar to those of test material 30. Leads of a thermocouple wire 20 leading from a remotely situated temperature sensing device 35 are each fed through one of the holes 17 or 18, secured at head end 13 of ceramic insulator rod 15, and exit at tip end 14. Each lead of thermocouple wire 20 is bent into and secured in an opposite radial groove 25 in tip end 14 of threaded bolt 12. Resulting threaded average temperature thermocouple 11 is ready to be inserted into cylindrical receptacle 32. The tip end 14 of the threaded average temperature thermocouple 11 is in intimate contact with receptacle 32. A jam nut 36 secures the threaded average temperature thermocouple 11 to test material 30.

5 Claims, 1 Drawing Sheet

THREADED AVERAGE TEMPERATURE THERMOCOUPLE

ORIGIN OF THE INVENTION

The invention described herein was made by an employee of the United States Government and may be manufactured and used by or for the Government for governmental purposes without the payment of any royalties thereon or therefor.

This is a continuation of application Ser. No. 244,376, filed Sept. 15, 1988, now abandoned.

TECHNICAL FIELD OF THE INVENTION

This invention relates generally to a thermocouple, and more particularly to a thermocouple for measuring the average temperature of a test material which surrounds the thermocouple.

BACKGROUND OF THE INVENTION

In materials testing, it is often useful to measure various temperature properties of a test material. For example, in wind tunnel testing, researchers often measure the effects of various pressure and force conditions in relation to the temperature of the test material. Specifically, determining the average surface temperature of a particular portion of the test material is often very helpful. Prior methods for determining the average surface temperature include tack welding a thermocouple to the back of the test material. However, such a method is ineffective with thick materials (greater than approximately ⅜ inch) and materials with poor thermal conductivity because of undesirable temperature gradients. Moreover, some materials such as nickel are difficult to tack weld if thick. In addition, some other materials such as aluminum are impossible to tack weld, regardless of thickness.

Accordingly, it is an object of this invention to provide a device for measuring the average surface temperature of relatively thick test materials.

It is a further object of this invention to perform the above object in a high speed wind tunnel or in any other situation where protrusions beyond the test surface are undesirable.

It is a further object of this invention to perform the above objects of this invention with a wide variety of test materials.

It is a further object of the invention to accomplish the above objects quickly, simply, and inexpensively.

Other objects and advantages of this invention will become apparent hereinafter in the specification and drawings which follow.

SUMMARY OF THE INVENTION

According to the present invention, the foregoing and additional objects are obtained by providing a threaded average temperature thermocouple which comprises a threaded bolt, a ceramic insulator rod, and a thermocouple wire. A cylinder is bored through the longitudinal axis of symmetry of the threaded bolt. A ceramic insulator rod with two holes parallel through its length is then fitted into this bored cylinder. Two leads of a thermocouple wire communicating with a temperature sensing device are each inserted through a hole of the rod at the head end of the bolt. Upon exiting the holes, the leads of the thermocouple wire are each secured in a groove on opposite sides of the tip end of the bolt. Likewise, the thermocouple wire is secured where it enters the rod. The resulting threaded average temperature thermocouple is then screwed into a like-threaded receptacle in the test material. Thus, the average temperature of this receptacle is measured. Also, the threaded average temperature thermocouple may be secured so that no disfavored irregularities result in the surface of the test material during wind tunnel testing or other similar testing situation. A jam nut on the head end of the bolt assures a solid mount.

DETAILED DESCRIPTION OF THE INVENTION

Figure 1:
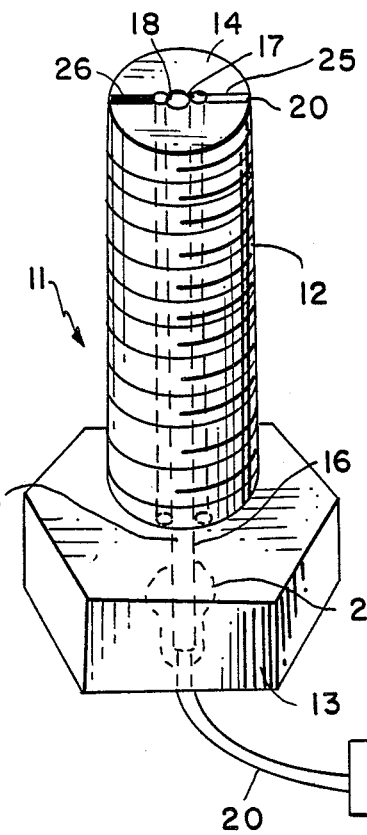
FIG. 1 is a schematic diagram of a threaded average temperature thermocouple according to the present invention.

As illustrated in FIG. 1, a threaded average thermocouple 11 according to the present invention comprises a threaded rod or bolt 12, a ceramic insulator rod 15, and a thermocouple wire 20. First, a cylinder 16 is bored along the longitudinal axis of symmetry of threaded bolt 12. Next, the tip end 14 of threaded bolt 12 is grooved radially. Resulting opposite grooves 25 have a depth slightly greater than the diameter of a lead of thermocouple wire 20. Ceramic insulator rod 15, which has a diameter which is only slightly less than the diameter of bored cylinder 16, is then securely fitted into bored cylinder 16. Ceramic insulator rod 15 has two parallel holes 17 and 18 running through its entire length.

Thermocouple wire 20 leads from a remotely situated temperature sensing device 35 pass through holes 17 and 18 of ceramic insulator rod 15 at the head end 13 of threaded bolt 12. Upon exiting holes 17 and 18 at the tip end 14 of threaded bolt 12, the leads of thermocouple wire 20 are each bent into an opposite groove 25. Each lead is then either tack welded or peened into their respective opposite groove 25. Ceramic filler 26 then fills opposite grooves 25, throughly covering the leads of thermocouple wire 20 and bonding them flush with the tip end 14. Next, epoxy resin 27 is potted around thermocouple wire 20 when it enters ceramic insulator rod 15 at the head end 13.

Figure 2:
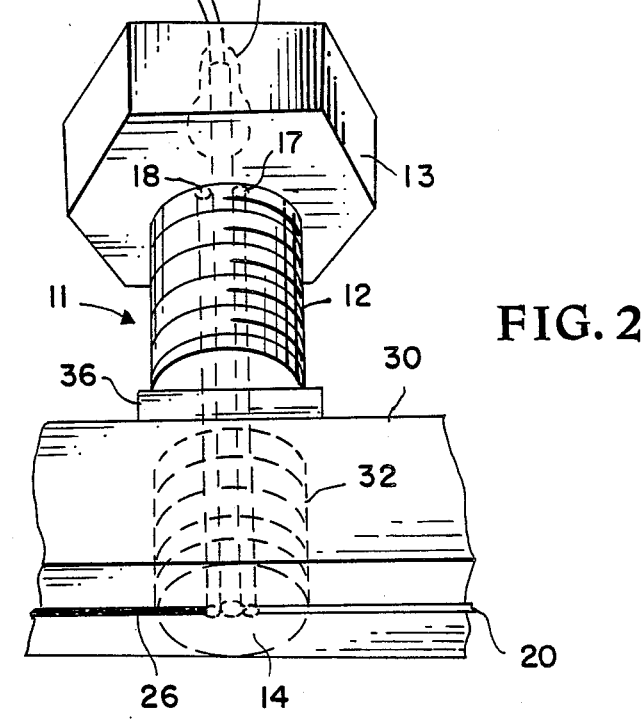
FIG. 2 is an exposed view of a threaded cylindrical receptacle in a test material, and a threaded average temperature thermocouple according to the present invention in association therewith.

Referring now to FIG. 2, threaded average temperature thermocouple 11 and test material 30 with a width of approximately ⅜" are shown. Since the average temperature of test material 30 is to be measured, both threaded bolt 12 and test material 30 should share similar thermal properties such as conductivity. First, a jam nut 36 is screwed onto threaded bolt 12. Next, a threaded cylindrical receptacle 32 is bored through test material 30. The threads of cylindrical receptacle 32 correspond to the threads of bolt 12 of the threaded average temperature thermocouple 11. The threaded average temperature thermocouple 11 is then inserted, i.e., screwed into threaded cylindrical receptacle 32 until tip end 14 is flush with the outer surface of test material 30. Threaded cylindrical receptacle 32 may be a pre-existing bored cylinder for other devices such as an ordinary heat flux gage. Jam nut 36 is then screwed towards tip end 14 until it comes into contact with the lower surface of test material 30. Threaded rod 12 of the threaded average temperature thermocouple 11 is then in intimate contact with test material 30. Thus, the average temperature of threaded receptacle 32 may be measured. Also, the tip end 14 of threaded average temperature thermocouple 11, filled with ceramic filler 26, conforms to the outer surface of test material 30, thereby avoiding the production of any holes or protuberances in this outer surface.

Accordingly, threaded average temperature thermocouple 11 obtains the average temperature of the test material 30. When securely threaded into cylindrical receptacle 32, threaded average temperature thermocouple 11 may be used in a high speed wind tunnel, for example at Mach 7 conditions. The simplicity of the present invention also allows for quick and economical fabrication and installation.

What is claimed is:

1. A device for measuring the average temperature of a test material of a determined thickness and having substantially parallel inner and outer surfaces, said outer surface being subjected to wind tunnel testing comprising:

a threaded bolt having a flat end face in a tip end and of a length greater than the width of said test material and having a bored cylinder along its longitudinal axis of symmetry and extending therethrough, said bolt being composed of a material having thermal properties similar to those of said test material;

a ceramic insulator rod with two parallel holes through the length thereof and securely fitted inside said bored cylinder;

a thermocouple wire having two cylindrical leads of equal diameter and which each extend from a remotely situated temperature sensing device, through a parallel hole at the head end of said bored cylinder, and exit at the tip end of said bored cylinder in said bolt;

two opposite radial grooves of a depth slightly greater than the diameter of said cylindrical leads formed in said end face in the tip end of said threaded bolt and communicating with said bored cylinder and disposed so that each of said cylindrical leads of said thermocouple wire is fully received and secured in an opposite radial groove in electrical contact with said tip end of said bolt;

ceramic insulator means for covering said cylindrical leads in said grooves and thereby bonding said cylindrical leads flush to the flat end face of said tip end of said bolt;

insulating means for securing said thermocouple wire to the head end of said threaded bolt;

a threaded cylindrical receptacle extending through said test material transverse to said inner and outer surfaces;

a locking means for securing said bolt into said receptable such that said bolt is in intimate contact with said inner surface of said test material and the flat end face of said tip end of said bolt is flush with the outer surface of said test material, but does not create any holes or protuberances on the outer surface thereof;

whereby the average temperature of the tip end of said bolt subject to wind tunnel tests is quickly and efficiently measured, said measured average temperature of said end face of said tip end of said bolt corresponding to and thus the measurement of the average temperature of said outer surface of said test material subject to the said wind tunnel testing.

2. The device of claim 1 wherein said bolt is threaded and said cylindrical receptacle is like-threaded, whereby said device may be utilized in high speed wind tunnel testing.

3. The device of claim 1 wherein said means for securing said thermocouple wire to the head end of said threaded bolt is an epoxy resin.

4. The device of claim 1 wherein each of said leads is secured in an opposite radial groove in electrical contact with said bolt by tack welding.

5. The device of claim 1 wherein each of said leads is secured in an opposite radial groove in electrical contact with said bolt by peening.

* * * * *